(12) United States Patent
Lin et al.

(10) Patent No.: US 11,630,362 B1
(45) Date of Patent: Apr. 18, 2023

(54) ONE-WAY GLASS WITH SWITCHING MODES

(71) Applicant: NATIONAL SUN YAT-SEN UNIVERSITY, Kaohsiung (TW)

(72) Inventors: Tsung-Hsien Lin, Kaohsiung (TW); Chun-Ta Wang, Kaohsiung (TW); Heng-Yi Tseng, Kaohsiung (TW); Cheng-Chang Li, Kaohsiung (TW); Li-Min Chang, Kaohsiung (TW); Kuan-Wu Lin, Kaohsiung (TW); Hung-Chang Jau, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 17/843,051

(22) Filed: Jun. 17, 2022

(30) Foreign Application Priority Data

Mar. 23, 2022 (TW) .................................. 111110881

(51) Int. Cl.
| | |
|---|---|
| *G02F 1/139* | (2006.01) |
| *G02F 1/1335* | (2006.01) |
| *G02F 1/13363* | (2006.01) |
| *G02F 1/137* | (2006.01) |

(52) U.S. Cl.
CPC ...... *G02F 1/1396* (2013.01); *G02F 1/133531* (2021.01); *G02F 1/133536* (2013.01); *G02F 1/133638* (2021.01); *G02F 1/13706* (2021.01); *G02F 1/13712* (2021.01); *G02F 1/133543* (2021.01); *G02F 2201/08* (2013.01); *G02F 2202/04* (2013.01); *G02F 2202/16* (2013.01); *G02F 2203/07* (2013.01); *G02F 2413/01* (2013.01); *G02F 2413/05* (2013.01); *G02F 2413/08* (2013.01)

(58) Field of Classification Search
CPC ......... G02F 1/133536; G02F 1/133548; G02F 1/13725; G02F 1/133541; G02F 1/133543; G02F 1/133545; G02F 1/1396
See application file for complete search history.

(56) References Cited

U.S. PATENT DOCUMENTS

| | | | |
|---|---|---|---|
| 11,493,787 B1 | 11/2022 | Lin et al. | |
| 2002/0041346 A1* | 4/2002 | Faris .................... | C09D 11/037 349/98 |
| 2005/0012879 A1* | 1/2005 | Lin .................... | G02F 1/133555 349/114 |
| 2012/0147280 A1* | 6/2012 | Osterman .............. | G02B 30/25 349/8 |

(Continued)

*Primary Examiner* — Alexander P Gross
(74) *Attorney, Agent, or Firm* — WPAT, PC

(57) ABSTRACT

A one-way glass with switching modes includes an absorbing layer located on a weak light side, a reflecting layer located on an intense light side, and a converting layer stacked between the absorbing layer and the reflecting layer. The absorbing layer absorbs first polarized light and allows second polarized light to pass through. The reflecting layer reflects the first polarized light and allows the second polarized light to pass through. Unpolarized light incident from the weak light side or from the intense light side is respectively converted into the polarized light. During the process of gradually adjusting the converting layer from a twisted state to a vertical state, rotated angles of polarization directions of the first polarized light and the second polarized light gradually decrease.

9 Claims, 6 Drawing Sheets

(56) References Cited

U.S. PATENT DOCUMENTS

2016/0154269 A1* 6/2016 Fukuoka .................. G09G 3/34
                                                    345/87
2017/0336675 A1* 11/2017 Kim .................... G02F 1/13725

* cited by examiner

ONE-WAY GLASS WITH SWITCHING MODES

CROSS REFERENCE TO RELATED APPLICATION

The application claims the benefit of Taiwan application serial No. 111110881, filed on Mar. 23, 2022, and the entire contents of which are incorporated herein by reference.

BACKGROUND OF THE INVENTION

1. Field of the Invention

The present invention generally relates to an optical apparatus and, more particularly, to a one-way glass with switching modes which optimizes one-way light transmission effect.

2. Description of the Related Art

One viewing side of the one-way glass can be penetrated by light, which provides a transparent glass effect, and the other side can reflect light, which provides a mirror effect and can be used for one-way observation or special rooms for privacy protection, such as interrogation rooms, experimental observation and cabs, etc. On a light sufficient side of the one-way glass, only the reflected image of the same side can be seen, and on the other side with weaker light, the image from the opposite side (the light sufficient side) can be seen.

The conventional one-way glass mentioned above is coated with a metal film with high reflectivity on one side of the one-way glass, so that part of the light penetrates the glass and part of the light is reflected. When there is big difference between the light intensity on two sides of the one-way glass, the intensity of the reflected light to be seen on the light sufficient side of the one-way glass is higher than that of the penetrating light, and only the reflected image can be seen on the same side. On the contrary, the intensity of the penetrating light to be seen on the side with weaker light of the one-way glass is higher than that of the reflected light, and the penetrating image from the opposite side can be seen. However, the conventional one-way glass cannot achieve the effect of one-way observation and privacy protection when the light intensity on both sides is similar. Therefore, the utilization of the conventional one-way glass is limited by environmental factors, in which the light intensity on both sides of the one-way glass must be kept at a fixed intensity ratio. Moreover, the conventional one-way glass cannot switch between different functions or adjust the one-way light transmission effect, which makes the conventional one-way glass inconvenient to use and limited in the scope of application.

In light of the above, it is necessary to improve the conventional one-way glass.

SUMMARY OF THE INVENTION

It is therefore an objective of this invention to provide a one-way glass with switching modes which can improve the one-way light transmission effect.

It is another objective of this invention to provide a one-way glass with switching modes which can be switched between a mirror mode and a transparent mode.

It is yet another objective of this invention to provide a one-way glass with switching modes of which the transmittance of one-way mirror can be freely adjusted according to the intensity of ambient light.

As used herein, the terms "zero-degree" and "ninety-degree" for describing the directions of polarized light of the present invention refer to the accompanying drawings. The "zero-degree" direction is parallel to a horizontal plane of the drawing and facing towards upside or downside of the drawing, whereas the "ninety-degree" direction is perpendicular to the drawing. The terms are only used to assist in the illustration and understanding of the various embodiments of the present invention and thus are not limitations of the present invention, while the characteristics and principles of polarized light are understood by a person having ordinary skill in the art.

As used herein, the term "one" or "an" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling", "join", "assembly" or the like is used to include separation of connected members without destroying the members after connection or inseparable connection of the members after connection. A person having ordinary skill in the art would be able to select the type of connection according to desired demands in the material or assembly of the members to be connected.

In an aspect, a one-way glass with switching modes according to the invention includes an absorbing layer located on a weak light side, a reflecting layer located on an intense light side, and a converting layer stacked between the absorbing layer and the reflecting layer. The absorbing layer absorbs first polarized light and allows second polarized light to pass through the absorbing layer. The first polarized light and the second polarized light are orthogonal to each other. The reflecting layer reflects the first polarized light and allows the second polarized light to pass through the reflecting layer. Unpolarized light incident from the weak light side into the absorbing layer and from the intense light side into the reflecting layer respectively becomes the second polarized light and pass through the converting layer. When the converting layer is in a twisted state, the second polarized light passes through the converting layer and is rotated into the first polarized light, and the first polarized light passes through the converting layer and is rotated into the second polarized light. When the converting layer is in a vertical state, the first polarized light and the second polarized light is unchanged after passing through the converting layer. During a process of gradually adjusting the converting layer from the twisted state to the vertical state, rotated angles of polarization directions of the first polarized light and the second polarized light gradually decrease.

Based on the above, the one-way glass with switching modes according to the invention utilizes the converting layer to switch the polarization type of the light passing through, and then restricts the proportions of penetration and reflection of the light by the absorbing layer and the reflecting layer, so that the light respectively incident either from an intense light side or from a weak light side can both be used and switched between mirror reflection and transparent effects. It can be easily switched among a double-sided mirror mode that shields light transmission in both directions, a one-way mirror mode that protects privacy in one direction, a single-sided mirror mode that shields light transmission in one direction and reflects in another direction, and a transparent glass mode that can see through in both directions. In addition, in the one-way mirror mode, the converting layer can be adjusted according to different ambient light intensity ratios to optimize the one-way mirror effect, which does not require additional use of active devices such as dimming elements, adjustable diffusion films, or transmittance/reflectivity controlling layers. It can lower the technical difficulty and cost of production, and achieve the effects of multi-functional application, easy operation, reduced manufacturing cost, and improved one-way mirror effect.

In an example, the absorbing layer is an absorptive linear polarizer. The first polarized light and the second polarized light is linear polarized light. A direction of a transmission axis of the absorbing layer is perpendicular to a polarization direction of the first polarized light and parallel to a polarization direction of the second polarized light. Thus, unpolarized light passing through the absorbing layer can be absorbed and the second polarized light remains, ensuring the effects of controlling the intensity of incident and returning light.

In an example, the reflecting layer is a reflective linear polarizer. A direction of a transmission axis of the reflecting layer is parallel to the direction of the transmission axis of the absorbing layer. Thus, unpolarized light passing through the reflecting layer can be divided into the first polarized light to be reflected and the second polarized light to passing through, ensuring the effect of proving a mirror mode on the intense light side.

In an example, the reflecting layer includes a phase retarder and a reflector. The phase retarder is stacked between the converting layer and the reflector. The first polarized light passes through the phase retarder to become a third polarized light. The second polarized light passes through the phase retarder to become a fourth polarized light. The third polarized light passes through the phase retarder to become the first polarized light. The fourth polarized light passes through the phase retarder to become the second polarized light. The third polarized light is reflected by the reflector, and the fourth polarized light passes through the reflector. Thus, the phase retarder and the reflector can replace the costly reflective linear polarizer and achieve the function thereof, ensuring the effect of reducing the cost of components.

In an example, the phase retarder is a quarter wave plate. An angle between a direction of an optical axis of the phase retarder and the direction of the transmission axis of the absorbing layer is 45 degrees. Thus, the linearly polarized light can pass through the phase retarder to become circularly polarized light, and thus the wave nature of the incident light can be transformed, ensuring the effects of controlling the light input and output.

In an example, the reflector is a liquid crystal element having a helical structure with a graded pitch. A chiral direction of the helical structure of the reflector is the same as a polarization direction of the third polarized light. Thus, the third polarized light is reflected by the reflector, and the fourth polarized light passes through the reflector, ensuring the effects of controlling the penetration or reflection of circularly polarized light.

In an example, the liquid crystal element includes a cholesteric liquid crystal with a broad reflection band located between two transparent substrates. Thus, the reflector can reflect light of different wavelengths, ensuring the effect of reflecting light with a wide wavelength band.

In an example, the converting layer includes a twisted nematic liquid crystal located between two substrates which are conductive and transparent. Thus, the converting layer can change the twisted state of the liquid crystals by adjusting the intensity of the electric field, ensuring the effect of modulating the optical performance of the liquid crystals.

In an example, the twisted nematic liquid crystal is a positive liquid crystal. When an electric field is not provided, the converting layer is in the twisted state where the positive liquid crystal has a twisted alignment. When the electric field is provided, the converting layer is in the vertical state where the positive liquid crystal has a vertical alignment. Thus, the converting layer can rotate the polarization direction of the penetrating light to provide a single-sided mirror mode or a double-sided mirror mode when the power is turned off, ensuring the effect of shielding light penetration as normal.

In an example, the twisted nematic liquid crystal is a negative liquid crystal. When an electric field is provided, the converting layer is in the twisted state where the negative liquid crystal has a twisted alignment. When the electric field is not provided, the converting layer is in the vertical state where the negative liquid crystal has a vertical alignment. Thus, the converting layer can allow the penetrating light to directly pass through to provide a transparent glass mode when the power is turned off, ensuring the effect of two-way transparency as normal.

In an example, the twisted nematic liquid crystal is doped with dichroic dyes. A long axis of the dichroic dyes is aligned with the twisted nematic liquid crystal of the converting layer. Thus, when the polarization direction of the linearly polarized light is parallel to the long axis of the dichroic dyes, the absorption of light can be maximized, ensuring the effects of shielding light penetration and improving the quality of the one-way mirror mode.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
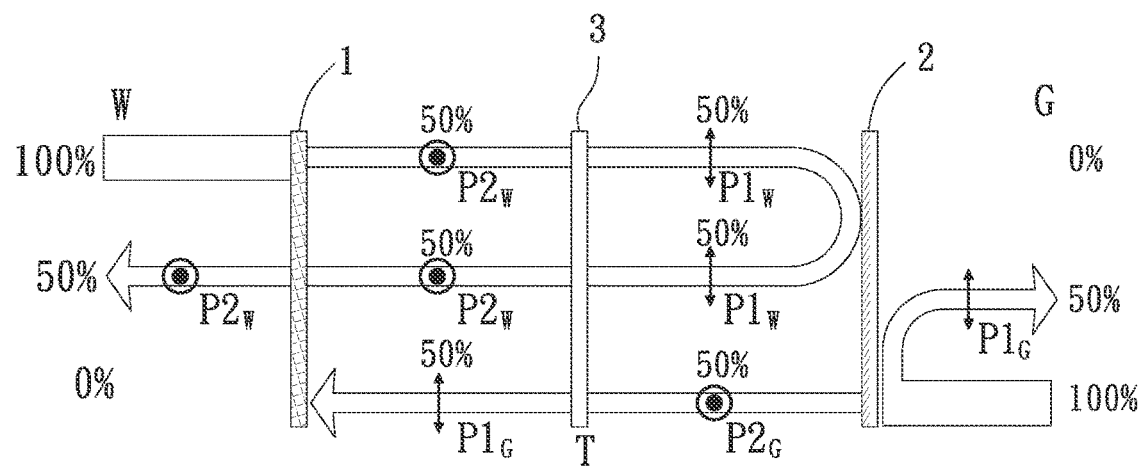
FIG. 1 is a schematic view of the light conversion in the double-sided mirror mode in the first embodiment of the invention.

In the various figures of the drawings, the same numerals designate the same or similar parts, and the description thereof will be omitted. Furthermore, when the terms "front", "rear", "left", "right", "up (top)", "down (bottom)", "inner", "outer", "side", and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
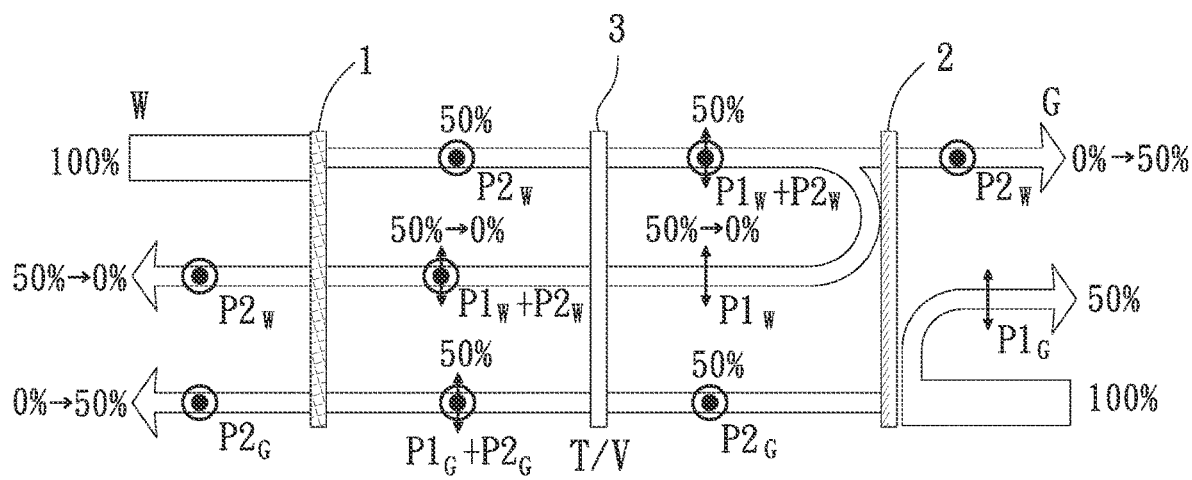
FIG. 2 is a schematic view of the light conversion in the one-way mirror mode in the first embodiment of the invention.
Figure 3:
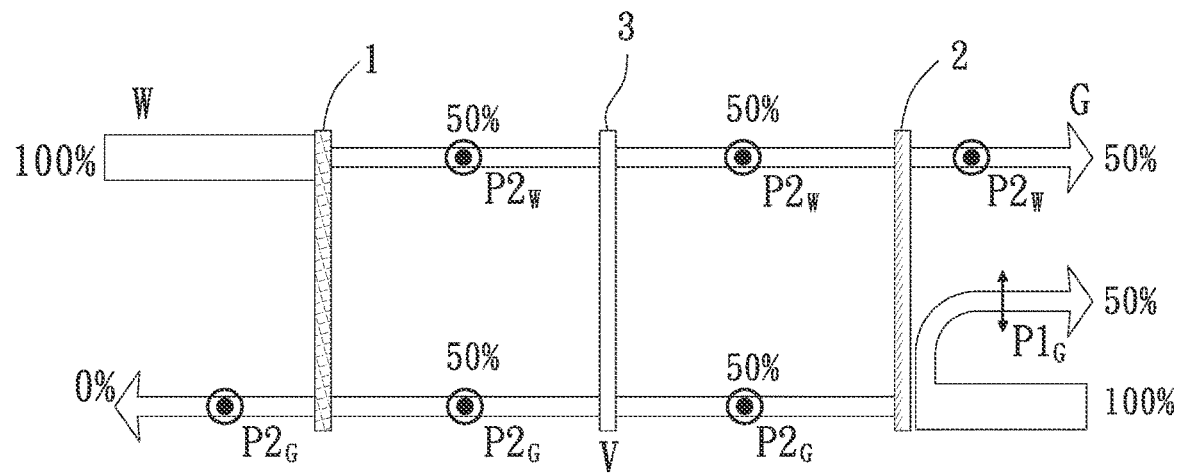
FIG. 3 is a schematic view of the light conversion in the transparent glass mode in the first embodiment of the invention.

Referring to FIGS. 1 to 3, a one-way glass with switching modes according to the invention includes an absorbing layer 1, a reflecting layer 2, and a converting layer 3. The absorbing layer 1 and the reflecting layer 2 are respectively laminated on two surfaces of the converting layer 3. The absorbing layer 1 is located on a weak light side W with lower illumination intensity, and the reflecting layer 2 is located on an intense light side G with higher illumination intensity.

The absorbing layer 1 is used to absorb first polarized light $P1_W$, $P1_G$ and allow the second polarized light $P2_W$, $P2_G$ to pass through. The first polarized light $P1_W$, $P1_G$ and the second polarized light $P2_W$, $P2_G$ are orthogonal to each other. The polarization states and the polarization directions of the first polarized light $P1_W$, $P1_G$ and the second polarized light $P2_W$, $P2_G$ are determined by the polarization states and the rotation directions of the selected absorbing layer 1, which is not limited in the present invention. In this embodiment, the absorbing layer 1 is an absorptive linear polarizer with a ninety-degree transmission axis, whereas the first polarized light $P1_W$, $P1_G$ is zero-degree linearly polarized light, and the second polarized light $P2_W$, $P2_G$ is ninety-degree linearly polarized light. When the light from the weak light side W is incident into the absorbing layer 1, the zero-degree linearly polarized light $P1_W$ is absorbed by the absorbing layer 1, and the second polarized light $P2_W$ passes through the absorbing layer 1. On the other hand, among the light incident from the intense light side G, the first polarized light $P1_G$ cannot pass through the absorbing layer 1, but the second polarized light $P2_G$ can pass through the absorbing layer 1 to the weak light side W.

The reflecting layer 2 is used to reflect the first polarized light $P1_W$, $P1_G$ and allow the second polarized light $P2_W$, $P2_G$ to pass through. In this embodiment, the reflecting layer 2 is a reflective linear polarizer, and the direction of the transmission axis of the reflecting layer 2 is parallel to the direction of the transmission axis of the absorbing layer 1. When the light is incident from the intense light side G into the reflecting layer 2, the first polarized light $P1_G$ is reflected by the reflecting layer 2, and the second polarized light $P2_G$ passes through the reflecting layer 2. On the other hand, among the light incident from the weak light side W, the first polarized light $P1_W$ can be reflected by the reflecting layer 2, and the second polarized light $P2_W$ can pass through the reflecting layer 2 to the intense light side G.

The converting layer 3 is stacked between the absorbing layer 1 and the reflecting layer 2, so as to rotate the polarization directions of the first polarized light $P1_W$, $P1_G$ and the second polarized light $P2_W$, $P2_G$. The converting layer 3 can be a component for adjusting the linear polarization angle of the light passing through. In this embodiment, the converting layer 3 includes a twisted nematic liquid crystal (TNLC) located between two substrates which are conductive and transparent. By applying an electric field to the twisted nematic liquid crystal, it can be switched between a twisted state T having a twisted alignment and a vertical state V having a vertical alignment to the two substrates. For example, if the twisted nematic liquid crystal of the converting layer 3 is a positive liquid crystal, the converting layer 3 is in the twisted state T when the electric field is not provided. The converting layer 3 turns from the twisted state T to the vertical state V when the intensity of the electric field is gradually increased. The stronger the electric field, the more the converting layer 3 turns to the vertical state V. The weaker the electric field, the more the converting layer 3 turns to the twisted state T. When the electric field raises to a critical value, the converting layer 3 is in the vertical state V. Further, if the twisted nematic liquid crystal of the converting layer 3 is a negative liquid crystal, the converting layer 3 is in the vertical state V when the electric field is not provided. The weaker the electric field, the more the converting layer 3 turns to the vertical state V. The stronger the electric field, the more the converting layer 3 turns to the twisted state T. When the electric field of critical value is provided, the converting layer 3 is in the twisted state T.

When the converting layer 3 is in the twisted state T, the polarization direction of the linearly polarized light passing through the converting layer 3 can be rotated by ninety degrees. Therefore, the first polarized light $P1_W$, $P1_G$ passing through the converting layer 3 in the twisted state T can be rotated into the second polarized light $P2_W$, $P2_G$. The second polarized light $P2_W$, $P2_G$ passing through the converting layer 3 in the twisted state T can be rotated to the first polarized light $P1_W$, $P1_G$. When the converting layer 3 is in the vertical state V, the polarization direction of the linearly polarized light is unchanged after passing through the converting layer 3. Therefore, the first polarized light $P1_W$, $P1_G$ and the second polarized light $P2_W$, $P2_G$ is unchanged after passing through the converting layer 3 in the vertical state V. When the converting layer 3 is between the twisted state T and the vertical state V and turns to the twisted state T more, the rotation angle of the linearly polarized light becomes larger (closer to ninety degrees). The more the converting layer 3 turns to the vertical state V, the smaller the rotation angle of the linearly polarized light (closer to zero degrees). Referring to FIG. 2, if the polarization direction of the second polarized light $P2_W$ which has been rotated by the converting layer 3 is closer to that of the zero-degree linearly polarized light (the first polarized light $P1_W$), the following light in the reflecting layer 2 is divided into the first polarized light $P1_W$ and the second polarized light $P2_W$, in which the intensity of the first polarized light $P1_W$ is greater than that of the second polarized light $P2_W$. As such, by controlling the converting layer 3 to be between the twisted state T and the vertical state V, the polarization directions of the incident light from the intense light side G and from the weak light side W can be controlled to change the proportions of penetration, reflection and absorption of the light in the absorbing layer 1 and the reflecting layer 2.

Referring to FIG. 1, which shows a double-sided mirror mode in the first embodiment of the invention, with the converting layer 3 in the twisted state T and rotating the linearly polarized light by ninety degrees. The unpolarized light incident from the weak light side W passes through the absorbing layer 1 to become the second polarized light $P2_W$ with its intensity reduced by half, and then passes through the converting layer 3 to become the first polarized light $P1_W$. Afterwards, all the first polarized light $P1_W$ is reflected by the reflecting layer 2, returns along its original path and pass through the absorbing layer 1 as the second polarized light P2$_W$, which provides the mirror effect on the weak light side W. In addition, the unpolarized light incident from the intense light side G into the reflecting layer 2 is divided into the first polarized light P1$_G$ to be reflected by and the second polarized light P2$_G$ to pass through the reflecting layer 2. The first polarized light P1$_G$ provides the mirror effect on the intense light side G, and the second polarized light P2$_G$ passes through and is rotated by the converting layer 3 to become the first polarized light P1$_G$, which is absorbed by and cannot pass through the absorbing layer 1. As set forth above, either the light from the weak light side W or the light from the intense light side G cannot pass through to the other side, but it can only be reflected and return along its original path to the light output side. As such, by controlling the converting layer 3 to be in the twisted state T, the glass can be switched to a double-sided mirror with the effect of shielding light transmission in both directions.

Referring to FIG. 2, which shows the one-way mirror mode in the first embodiment of the invention. The converting layer 3 is between the twisted state T and the vertical state V, so that the rotated angle of the polarization direction of the linearly polarized light changed by the converting layer 3 can be adjusted. The unpolarized light incident from the weak light side W passes through the absorbing layer 1 to become the second polarized light P2$_W$ with its intensity reduced by half, and then passes through and is rotated by the converting layer 3 to become linearly polarized light between the first polarized light P1$_W$ and the second polarized light P2$_W$ (from zero degrees to ninety degrees). Afterwards, the linearly polarized light is divided into the first polarized light P1$_W$ to be reflected in the reflecting layer 2 and the second polarized light P2$_W$ to pass through to the intense light side G. The reflected first polarized light P1$_W$ returns along its original path and is rotated again into linearly polarized light between the first polarized light P1$_W$ and the second polarized light P2$_W$. That makes the intensity of the second polarized light P2$_W$ passing through the absorbing layer 1 gradually decrease, so as to weaken the reflected light intensity on the weak light side W and to reduce the mirror effect. On the other hand, the unpolarized light incident from the intense light side G into the reflecting layer 2 is divided into the first polarized light P1$_G$ to be reflected and the second polarized light P2$_G$ to pass through the reflecting layer 2. The transmitted second polarized light P2$_W$ continues to pass through the converting layer 3 and is rotated into linearly polarized light between the first polarized light P1$_W$ and the second polarized light P2$_W$. Then, only the second polarized light P2$_G$ can pass through the absorbing layer 1 to the weak light side W. As set forth above, since the intensity of the second polarized light P2$_W$ reflected back to the weak light side W is weaker than the intensity of the second polarized light P2$_G$ transmitted from the intense light side G to the weak light side W, the image from the intense light side G can be seen on the weak light side W. Since the intensity of the second polarized light P2$_W$ transmitted from the weak light side W to the intense light side G is weaker than the intensity of the first polarized light P1$_G$ reflected back to the strong light side G, only the reflected mirror image on the intense light side G but not the image from the weak light side W can been seen. As such, by controlling the converting layer 3 to be between the twisted state T and the vertical state V, the intensity ratios of the penetrating light to the reflected light on the intense light side G and the weak light side W can be adjusted to achieve the best one-way light transparency effect according to the intensity of ambient light.

Referring to FIG. 3, which shows the transparent glass mode in the first embodiment of the invention, with the converting layer 3 in the vertical state V. The polarization direction of the linearly polarized light passing through the converting layer 3 remains unchanged. The unpolarized light incident from the weak light side W passes through the absorbing layer 1 to become the second polarized light P2$_W$ with its intensity reduced by half, then continues to passe through the converting layer 3 with the second polarized light P2$_W$, and all passes through the reflecting layer 2 to the intense light side G. In addition, the unpolarized light incident from the intense light side G into the reflecting layer 2 is divided into the first polarized light P1$_G$ to be reflected by and the second polarized light P2$_G$ to pass through the reflecting layer 2. The second polarized light P2$_G$ continues to pass through the converting layer 3 with its polarization directions unchanged, which can pass through the absorbing layer 1 to the weak light side W. As set forth above, the beams of the light emitted either from the weak light side W or from the intense light side G can be split once and transmitted to the other side, so that a person on either side of the glass can see the image from the other side. As such, by controlling the converting layer 3 to be in the vertical state V, the glass can be switched to a transparent glass with two-way see-through effect.

Figure 4:
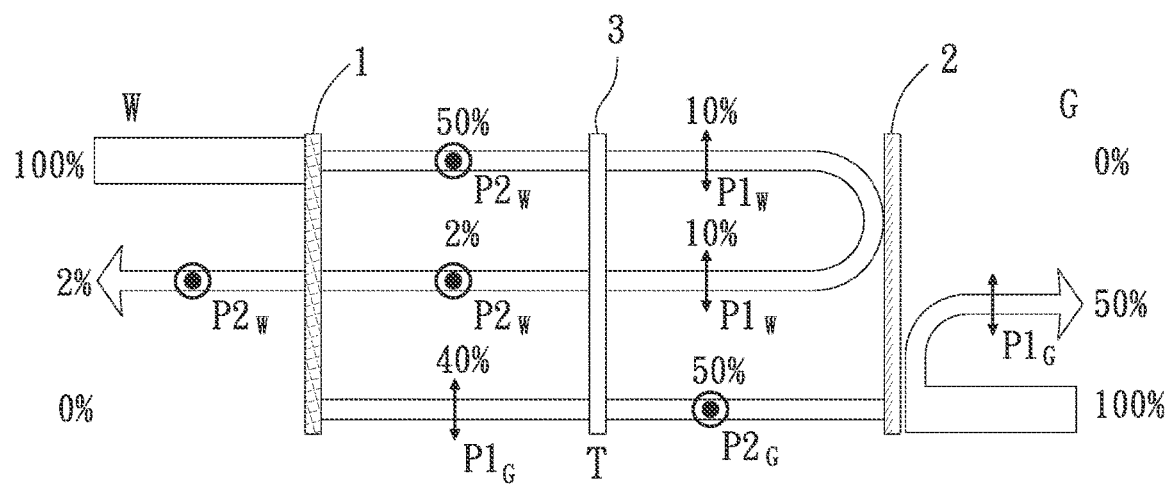
FIG. 4 is a schematic view of the light conversion in the single-sided mirror mode in the second embodiment of the invention.
Figure 5:
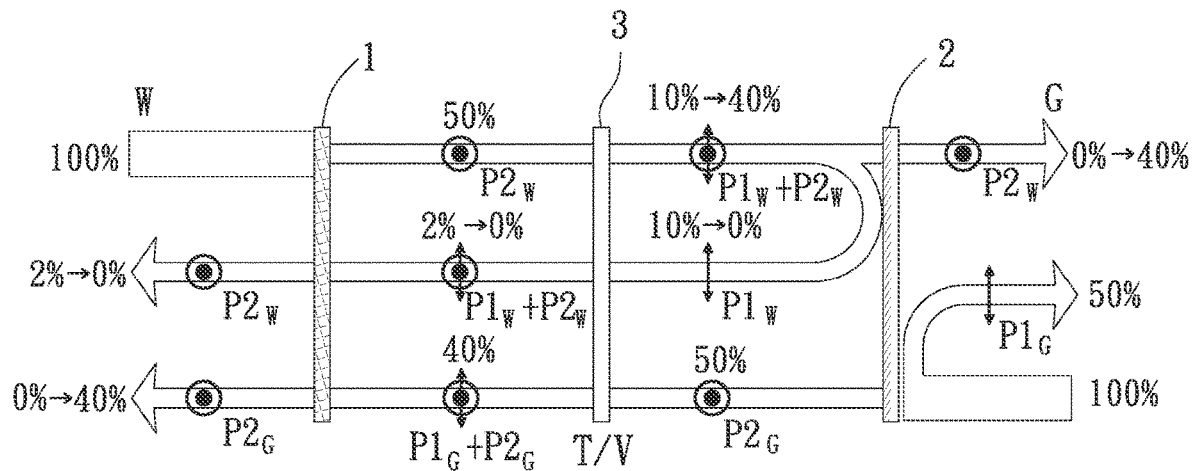
FIG. 5 is a schematic view of the light conversion in the one-way mirror mode in the second embodiment of the invention.
Figure 6:
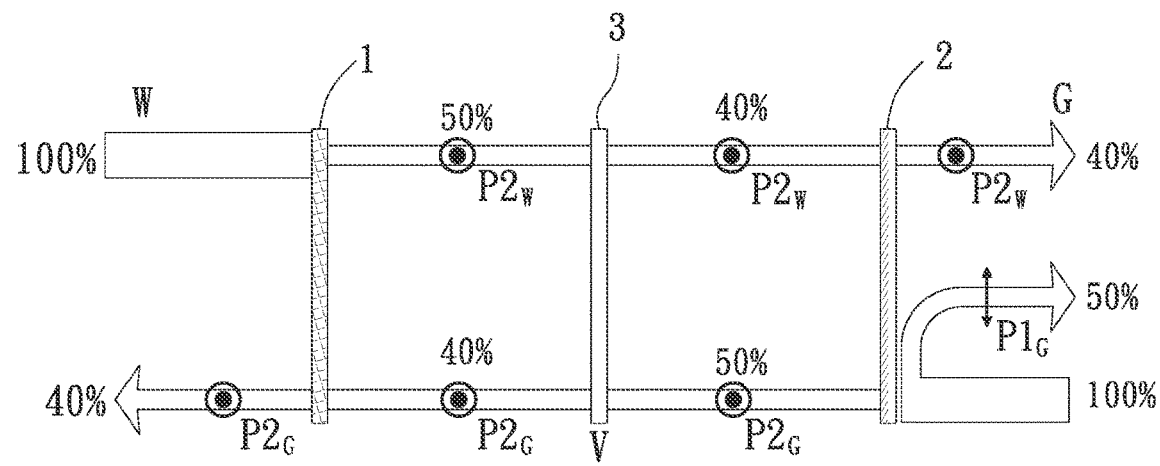
FIG. 6 is a schematic view of the light conversion in the transparent glass mode in the second embodiment of the invention.

Referring to FIGS. 4 to 6, which show the one-way glass with switching modes in the second embodiment of the present invention, this embodiment is substantially the same as the above-mentioned first embodiment. In this embodiment, materials of the liquid crystals in converting layer 3 are doped with dichroic dyes. According to the Guest-Host mode, a long axis of the dichroic dyes is aligned with the crystal arrangement of the converting layer 3. Moreover, if the polarization direction of the linearly polarized light is parallel to the long axis of the dichroic dyes, the dichroic dyes achieve the effect of maximizing the absorption of light, and if the polarization direction of the linearly polarized light is perpendicular to the long axis of the dichroic dyes, the dichroic dyes achieve the effect of minimizing the absorption of light.

Referring to FIG. 4, it shows the single-sided mirror mode in the second embodiment of the present invention. In this embodiment, the converting layer 3 is in the twisted state T and makes the long axis of the dichroic dyes into a twisted arrangement. Therefore, the long axis of the dichroic dyes on the side of the converting layer 3 close to the absorbing layer 1 is aligned in ninety degrees, which is parallel to the second polarized light P2$_W$, to make the second polarized light P2$_W$ be greatly absorbed by the converting layer 3. However, the long axis of the dichroic dyes on the side of the converting layer 3 close to the reflecting layer 2 is aligned in zero degrees, which is parallel to the first polarized light P1$_W$ and perpendicular to the second polarized light P2$_G$, to make the first polarized light P1$_W$ be greatly absorbed by the converting layer 3 and the second polarized light P2$_G$ be slightly absorbed only. As set forth above, the light transmitted from the weak light side W is greatly absorbed by the converting layer 3 twice, and the intensity of the light reflected back to the weak light side W is weak, so that there is only shielding effect but no mirror effect on the weak light side W of the glass. Besides, the light emitted from the intense light side G can still be reflected back to the intense light side G. As such, by controlling the converting layer 3 to be in the twisted state T, the glass can be switched to the single-sided mirror with the effects of shielding light transmission in one direction and reflection in another direction.

Referring to FIG. 5, it shows the one-way mirror mode in the second embodiment of the present invention. In this embodiment, the converting layer 3 is between the twisted state T and the vertical state V. As the electric field applied to the converting layer 3 raises, the long axis of the dichroic dyes gradually leaves the twisted state and tends to be perpendicular to the substrates on both sides of the converting layer 3, so that the absorption rate to the incident light from two sides of the converting layer 3 declines on both sides. The unpolarized light incident from the weak light side W is absorbed by the converting layer 3 and divided by the reflective layer 2 into the first polarized light $P1_W$ and the second polarized light $P2_W$ that arrives the intense light side G. The absorption ratio of the unpolarized light incident on the intense light side G is lower, so that the intensity of the second polarized light $P2_G$ arriving the weak light side W is higher. As set forth above, the intensity of the second polarized light $P2_W$ transmitted to the intense light side G can be adjusted through the converting layer 3, but the intensity of the second polarized light $P2_W$ is still lower than the intensity of the first polarized light $P1_G$ reflected back to the intense light side G. Thus, on the intense light side G, only the reflected mirror image can be seen but not the image from the weak light side W. The intensity of the second polarized light $P2_G$ transmitted to the weak light side W can be adjusted through the converting layer 3, and the intensity of the second polarized light $P2_G$ is greater than that of the second polarized light $P2_W$ reflected back to the weak light side W. Thus, the image from the intense light side G can be seen on the weak light side W. As such, by controlling the converting layer 3 to be between the twisted state T and the vertical state V and absorbing the light intensity through the dichroic dyes in the converting layer 3, it can weaken the intensity of the light transmitted to and reflected back to the weak light side W. If the intensity of ambient light on the weak light side W increases, it can still be adjusted to achieve the best one-way light transparency effect.

Referring to FIG. 6, it shows the transparent glass mode in the second embodiment of the present invention. In this embodiment, the converting layer 3 is in the vertical state V, so that the long axis of the dichroic dyes is perpendicular to the substrates on both sides of the converting layer 3, that is, perpendicular to the second polarized light $P2_W$, $P2_G$. That makes the second polarized light $P2_W$, $P2_G$ to be slightly absorbed by the converting layer 3. As set forth above, either the light from the weak light side W or the light from the intense light side G can be absorbed by and pass through the converting layer 3 to the other side, so that on either side of the glass can the image from the other side be seen. As such, by controlling the converting layer 3 to be in the vertical state V, the glass can be switched to a transparent glass with two-way see-through effect.

Figure 7:
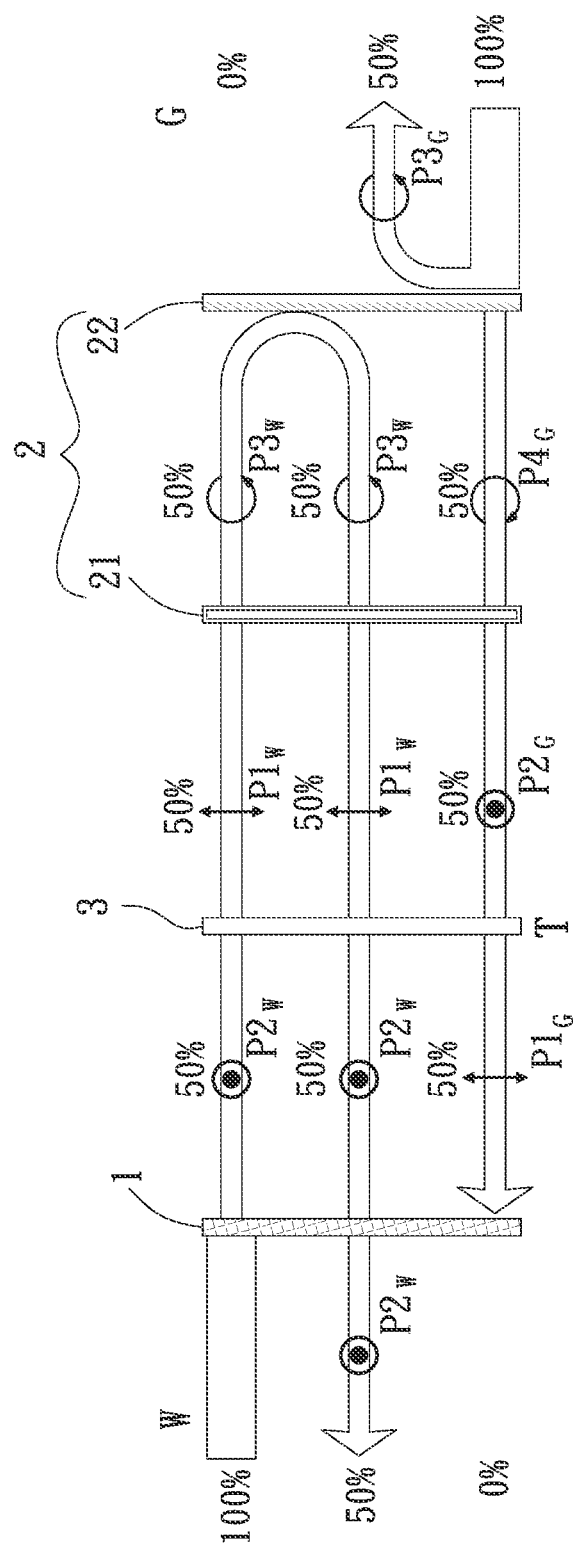
FIG. 7 is a schematic view of the light conversion in the double-sided mirror mode in the third embodiment of the invention.
Figure 8:
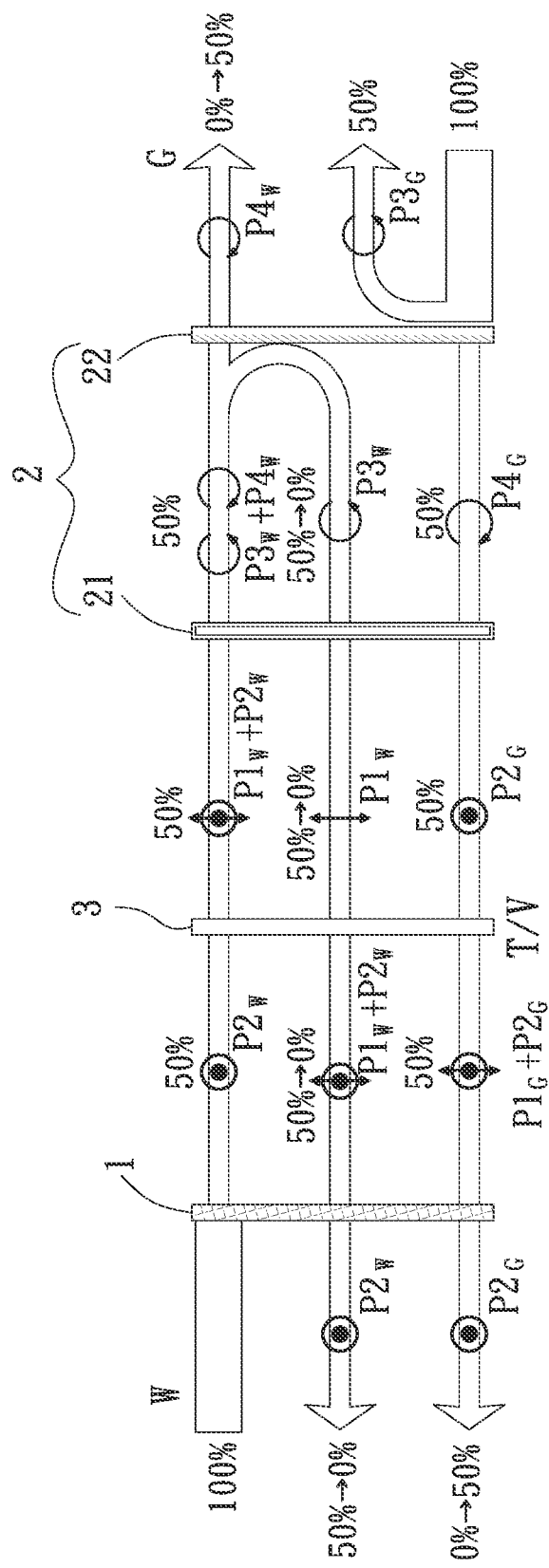
FIG. 8 is a schematic view of the light conversion in the one-way mirror mode in the third embodiment of the invention.
Figure 9:
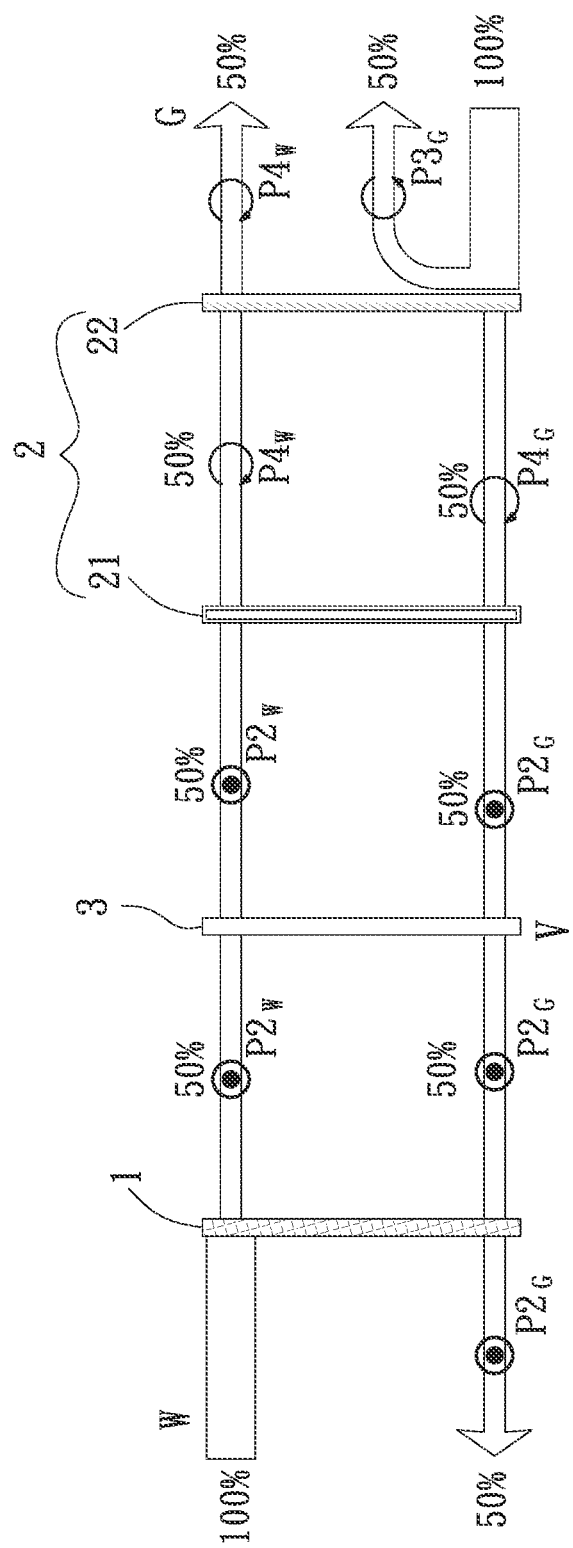
FIG. 9 is a schematic view of the light conversion in the transparent glass mode in the third embodiment of the invention.

Referring to FIGS. 7 to 9, which show the one-way glass with switching modes in the third embodiment of the present invention, this embodiment is approximately the same as the above-mentioned first embodiment. In this embodiment, the reflecting layer 2 includes a phase retarder 21 and a reflector 22. The phase retarder 21 is stacked between the converting layer 3 and the reflector 22. The first polarized light $P1_W$ passes through the phase retarder 21 to become a third polarized light $P3_W$. The second polarized light $P2_W$ passes through the phase retarder 21 to become a fourth polarized light $P4_W$. The third polarized light $P3_W$ passes through the phase retarder 21 to become the first polarized light $P1_W$. The fourth polarized light $P4_G$ passes through the phase retarder 21 to become the second polarized light $P2_G$. The third polarized light $P3_W$, $P3_G$ is reflected by the reflector 22, and the fourth polarized light $P4_W$, $P4_G$ passes through the reflector 22. In this embodiment, the phase retarder 21 is a quarter wave plate and its optical axis is of 45 degrees (between zero degrees and ninety degrees). Thus, the third polarized light $P3_W$, $P3_G$ is left-handed circularly polarized light, and the fourth polarized lights $P4_W$, $P4_G$ is right-handed circularly polarized light. The reflector 22 is a liquid crystal element having a helical structure with a graded pitch, such as a liquid crystal element formed by injecting cholesteric liquid crystal with a broad reflection band between two transparent substrates. In this embodiment, the chiral direction of the helical structure of the reflector 22 is the same as the polarization direction of the third polarized light $P3_W$, $P3_G$ (left-handed circularly polarized light), and the reflector 22 can reflect the third polarized light $P3_W$, $P3_G$ and allow the fourth polarized light $P4_W$, $P4_G$ to pass through. However, the present invention is not limited to the direction of the chiral direction of the helical structure of the reflector 22.

Referring to FIG. 7, which shows the double-sided mirror mode in the third embodiment of the present invention. The converting layer 3 is in the twisted state T and can rotate the linearly polarized light by ninety degrees. The unpolarized light incident from the weak light side W passes through the absorbing layer 1 and the converting layer 3 in sequence, and then enters the phase retarder 21 of the reflecting layer 2 as the first polarized light $P1_W$ to become the third polarized light $P3_W$. Afterwards, all the third polarized light $P3_W$ is reflected by the reflector 22, returns along the original path, and then passes through the absorbing layer 1 as the second polarized light $P2_W$, which provides the mirror effect on the weak light side W. In addition, the unpolarized light incident from the intense light side G into the reflector 22 is divided into the third polarized light $P3_G$ to be reflected by and the fourth polarized light $P4_G$ to pass through the reflector 22. The third polarized light $P3_G$ can provide a mirror effect on the intense light side G. The fourth polarized light $P4_G$ can pass through the phase retarder 21 and the converting layer 3 in sequence to be rotated into the first polarized light $P1_G$, so that the first polarized light $P1_G$ is unable to pass through the absorbing layer 1 and thereby absorbed. As set forth above, either the light from the weak light side W or the light from the intense light side G cannot pass through to the other side, but it can only be reflected and return along its original path to the light output side, respectively. As such, by controlling the converting layer 3 to be in the twisted state T, the glass can be switched to a double-sided mirror with the effect of shielding light transmission in both directions.

Referring to FIG. 8, which shows the one-way mirror mode in the third embodiment of the present invention. The converting layer 3 is between the twisted state T and the vertical state V, so that the rotated angle of the polarization direction of the linearly polarized light changed by the converting layer 3 can be adjusted. The unpolarized light incident from the weak light side W passes through the absorbing layer 1 and the converting layer 3 in sequence to be rotated into linearly polarized light between the first polarized light $P1_W$ and the second polarized light $P2_W$, and continues to pass through the phase retarder 21 to present the states of the third polarized light $P3_W$ and the fourth polarized light $P4_W$ simultaneously. Afterwards, the third polarized light $P3_W$ is reflected by the reflector 22 and returns along the original path to the weak light side W to become the second polarized light $P2_W$. The fourth polarized light $P4_W$ passes through the reflector 22 to reach the intense light side G. In addition, the unpolarized light incident from the intense light side G into the reflector 22 is divided into the third polarized light $P3_G$ to be reflected and the fourth polarized light $P4_G$ to pass through. The third polarized light $P3_G$ can provide a mirror effect on the intense light side G. The fourth polarized light $P4_G$ can pass through the phase retarder 21, the converting layer 3 and the absorbing layer 1 in sequence to reach the weak light side W as the second polarized light $P2_G$. As set forth above, since the intensity of the second polarized light $P2_W$ reflected back to the weak light side W is weaker than that of the second polarized light $P2_G$ transmitted from the intense light side G to the weak light side W, the image from the intense light side G can be seen on the weak light side W. The intensity of the fourth polarized light $P4_W$ transmitted from the weak light side W to the intense light side G is weaker than that of the third polarized light $P3_G$ reflected back to the intense light side G. Thus, on the intense light side G, only the reflected mirror image can be seen but not the image from the weak light side W. As such, by controlling the converting layer 3 to be between the twisted state T and the vertical state V, the intensity ratios of the penetrating light to the reflected light on the intense light side G and the weak light side W can be adjusted to achieve the best one-way light transparency effect according to the intensity of ambient light.

Referring to FIG. 9, which shows the transparent glass mode in the third embodiment of the present invention. The converting layer 3 is in the vertical state V, and the linearly polarized light passes through the converting layer 3 without changing its polarization direction. The unpolarized light incident from the weak light side W passes through the absorbing layer 1, the converting layer 3 and the phase retarder 21 in sequence to be rotated into the fourth polarized light $P4_W$, which can pass through the reflector 22 to reach the intense light side G. In addition, the unpolarized light incident from the intense light side G into the reflector 22 is divided into the third polarized light $P3_G$ to be reflected and the fourth polarized light $P4_G$ to pass through. The transmitted fourth polarized light $P4_G$ passes through the phase retarder 21 to be rotated into the second polarized light $P2_G$, and then passes through the converting layer 3 and the absorbing layer 1 in sequence to reach the weak light side W as the second polarized light $P2_G$. As set forth above, the beams of the light emitted either from the weak light side W or from the intense light side G can be split once and transmitted to the other side, so that a person on either side of the glass can see the image from the other side. As such, by controlling the converting layer 3 to be in the vertical state V, the glass can be switched to a transparent glass with two-way see-through effect.

It is noted that the liquid crystal material of the converting layer 3 doping with dichroic dyes disclosed in the second embodiment and the reflecting layer 2 having the phase retarder 21 and the reflector 22 disclosed in the third embodiment can be used separately or in combination according to user's need, and those are not limited to the disclosures in each embodiments and the drawings.

In summary, the one-way glass with switching modes according to the invention utilizes the converting layer to switch the polarization type of the light passing through, and then restricts the proportions of penetration and reflection of the light by the absorbing layer and the reflecting layer, so that the light respectively incident either from an intense light side or from a weak light side can both be used and switched between mirror reflection and transparent effects. It can be easily switched among a double-sided mirror mode that shields light transmission in both directions, a one-way mirror mode that protects privacy in one direction, a single-sided mirror mode that shields light transmission in one direction and reflects in another direction, and a transparent glass mode that can see through in both directions. In addition, in the one-way mirror mode, the converting layer can be adjusted according to different ambient light intensity ratios to optimize the one-way mirror effect, which does not require additional use of active devices such as dimming elements, adjustable diffusion films, or transmittance/reflectivity controlling layers. It can lower the technical difficulty and cost of production, and achieve the effects of multifunctional application, easy operation, reduced manufacturing cost, and improved one-way mirror effect.

Although the invention has been described in detail with reference to its presently preferable embodiments, it will be understood by one of ordinary skill in the art that various modifications can be made without departing from the spirit and the scope of the invention, as set forth in the appended claims. Further, if the above-mentioned several embodiments can be combined, the present invention includes any implementation aspects of combinations thereof.

What is claimed is:

1. A one-way glass with switching modes comprising:
an absorbing layer being an absorptive linear polarizer, located on a weak light side and configured for absorbing first polarized light and allowing second polarized light to pass through the absorbing layer, wherein the first polarized light and the second polarized light are both linear polarized light and are orthogonal to each other, with a direction of a transmission axis of the absorbing layer perpendicular to a polarization direction of the first polarized light and parallel to a polarization direction of the second polarized light;
a reflecting layer located on an intense light side and configured for reflecting the first polarized light and allowing the second polarized light to pass through the reflecting layer, with the reflecting layer including a phase retarder and a reflector; and
a converting layer stacked between the absorbing layer and the reflecting layer, wherein the phase retarder stacked between the converting layer and the reflector, wherein unpolarized light incident from the weak light side into the absorbing layer and from the intense light side into the reflecting layer respectively becomes the second polarized light and passes through the converting layer; when the converting layer is in a twisted state, the second polarized light passes through the converting layer and is rotated into the first polarized light, and the first polarized light passes through the converting layer and is rotated into the second polarized light; when the converting layer is in a vertical state, the first polarized light and the second polarized light is unchanged after passing through the converting layer; and wherein during a process of gradually adjusting the converting layer from the twisted state to the vertical state, rotated angles of polarization directions of the first polarized light and the second polarized light gradually decrease;
wherein the first polarized light passes through the phase retarder to become a third polarized light, the second polarized light passes through the phase retarder to become a fourth polarized light, the third polarized light passes through the phase retarder to become the first polarized light, and the fourth polarized light passes through the phase retarder to become the second polarized light, and wherein the third polarized light is reflected by the reflector, and the fourth polarized light passes through the reflector.

2. The one-way glass with switching modes as claimed in claim 1, wherein the reflecting layer is a reflective linear polarizer, and a direction of a transmission axis of the reflecting layer is parallel to the direction of the transmission axis of the absorbing layer.

3. The one-way glass with switching modes as claimed in claim 1, wherein the phase retarder is a quarter wave plate, and an angle between a direction of an optical axis of the phase retarder and the direction of the transmission axis of the absorbing layer is 45 degrees.

4. The one-way glass with switching modes as claimed in claim 1, wherein the reflector is a liquid crystal element having a helical structure with a graded pitch, and a chiral direction of the helical structure of the reflector is the same as a polarization direction of the third polarized light.

5. The one-way glass with switching modes as claimed in claim 4, wherein the liquid crystal element includes a cholesteric liquid crystal with a broad reflection band located between two transparent substrates.

6. The one-way glass with switching modes as claimed in claim 1, wherein the converting layer includes a twisted nematic liquid crystal located between two substrates, with the two substrates being conductive and transparent.

7. The one-way glass with switching modes as claimed in claim 6, wherein the twisted nematic liquid crystal is a positive liquid crystal, and wherein when an electric field is not provided, the converting layer is in the twisted state where the positive liquid crystal has a twisted alignment, and when the electric field is provided, the converting layer is in the vertical state where the positive liquid crystal has a vertical alignment.

8. The one-way glass with switching modes as claimed in claim 6, wherein the twisted nematic liquid crystal is a negative liquid crystal, and wherein when an electric field is provided, the converting layer is in the twisted state where the negative liquid crystal has a twisted alignment, and when the electric field is not provided, the converting layer is in the vertical state where the negative liquid crystal has a vertical alignment.

9. The one-way glass with switching modes as claimed in claim 6, wherein the twisted nematic liquid crystal is doped with dichroic dyes, and a long axis of the dichroic dyes is aligned with the twisted nematic liquid crystal of the converting layer.

* * * * *